(12) United States Patent
Millman et al.

(10) Patent No.: US 7,979,914 B2
(45) Date of Patent: Jul. 12, 2011

(54) TIME-BASED DIGITAL CONTENT AUTHORIZATION

(75) Inventors: Jonathan T. Millman, New York, NY (US); Ajit V. Rajasekharan, East Brunswick, NJ (US); Foy C. Sperring, Jr., Bay Shore, NY (US); Guy A. Story, Jr., New York, NY (US)

(73) Assignee: Audible, Inc., Newark, NJ (US)

( * ) Notice: Subject to any disclaimer, the term of this patent is extended or adjusted under 35 U.S.C. 154(b) by 0 days.

(21) Appl. No.: 12/431,295

(22) Filed: Apr. 28, 2009

(65) Prior Publication Data

US 2009/0210915 A1 Aug. 20, 2009

Related U.S. Application Data

(63) Continuation of application No. 10/179,762, filed on Jun. 24, 2002, now abandoned.

(60) Provisional application No. 60/301,115, filed on Jun. 25, 2001.

(51) Int. Cl.
*G06F 21/24* (2006.01)
*G06F 7/04* (2006.01)
*G06F 17/30* (2006.01)

(52) U.S. Cl. ............... 726/29; 726/26; 726/27; 726/33; 705/51

(58) Field of Classification Search ............... 726/29
See application file for complete search history.

(56) References Cited

U.S. PATENT DOCUMENTS

| 3,763,330 | A | 10/1973 | Fulwiler |
| 3,871,112 | A | 3/1975 | Licitis |
| 4,159,417 | A | 6/1979 | Rubincam |
| 4,266,243 | A | 5/1981 | Shutterly |
| 4,393,277 | A | 7/1983 | Besen et al. |
| 4,455,651 | A | 6/1984 | Baran |
| 4,473,824 | A | 9/1984 | Claytor |
| D276,626 | S | 12/1984 | Lockwood |
| 4,490,810 | A | 12/1984 | Hon |
| 4,499,568 | A | 2/1985 | Gremillet |
| 4,545,023 | A | 10/1985 | Mizzi |
| 4,575,621 | A | 3/1986 | Dreifus |

(Continued)

FOREIGN PATENT DOCUMENTS

EP 0128093 12/1984

(Continued)

OTHER PUBLICATIONS

Chang, Yee-Hsiang, et al., *An Open-Systems Approach to Video on Demand*, IEEE Communications Magazine, May 1994, pp. 68-79.

(Continued)

*Primary Examiner* — Matthew T Henning
(74) *Attorney, Agent, or Firm* — Knobbe, Martens, Olson & Bear LLP

(57) ABSTRACT

Methods and apparatuses for time-based access to digital content are provided. Access to a set of digital content is provided for a predetermined period of time. During the predetermined period of time, a user can access (e.g., download, play) any digital content in the set of digital content. At the end of the predetermined period of time, the user is denied access to the digital content regardless of where the content is stored (e.g., in a digital content library, on a computer system controlled by the user, on a playback device controlled by the user). Simplified access and control of digital content is thereby provided in the form of time-based access.

24 Claims, 7 Drawing Sheets

U.S. PATENT DOCUMENTS

| | | |
|---|---|---|
| 4,591,974 A | 5/1986 | Dornbush et al. |
| 4,601,011 A | 7/1986 | Grynberg |
| 4,658,093 A | 4/1987 | Hellman |
| D289,777 S | 5/1987 | Thomas |
| 4,682,368 A | 7/1987 | Takahashi |
| 4,698,776 A | 10/1987 | Shibata |
| 4,725,977 A | 2/1988 | Izumi et al. |
| 4,772,873 A | 9/1988 | Duncan |
| 4,779,080 A | 10/1988 | Coughlin et al. |
| 4,788,543 A | 11/1988 | Rubin |
| 4,788,675 A | 11/1988 | Jones et al. |
| 4,791,565 A | 12/1988 | Dunham et al. |
| 4,851,931 A | 7/1989 | Parker et al. |
| 4,855,725 A | 8/1989 | Fernandez |
| 4,885,725 A | 12/1989 | McCarthy et al. |
| 4,891,838 A | 1/1990 | Faber |
| 4,899,292 A | 2/1990 | Montagna et al. |
| D306,589 S | 3/1990 | Murayama |
| 4,916,441 A | 4/1990 | Gombrich |
| 4,924,378 A | 5/1990 | Hershey et al. |
| 4,937,863 A | 6/1990 | Robert et al. |
| 4,941,040 A | 7/1990 | Pocock et al. |
| 4,949,187 A | 8/1990 | Cohen |
| 4,989,179 A | 1/1991 | Simko |
| 5,008,872 A | 4/1991 | Tomoda et al. |
| 5,018,017 A | 5/1991 | Sasaki et al. |
| 5,042,070 A | 8/1991 | Linna et al. |
| 5,055,947 A | 10/1991 | Satoh |
| 5,065,258 A | 11/1991 | Warren et al. |
| 5,065,345 A | 11/1991 | Knowles et al. |
| 5,091,939 A | 2/1992 | Cole et al. |
| 5,091,942 A | 2/1992 | Dent |
| 5,099,422 A | 3/1992 | Foresman et al. |
| 5,115,508 A | 5/1992 | Hatta |
| 5,121,492 A | 6/1992 | Saville, III et al. |
| 5,126,990 A | 6/1992 | Efron et al. |
| 5,132,992 A | 7/1992 | Yurt et al. |
| 5,133,076 A | 7/1992 | Hawkins et al. |
| D330,544 S | 10/1992 | Kane |
| 5,153,729 A | 10/1992 | Saito |
| 5,159,182 A | 10/1992 | Eisele |
| 5,172,413 A | 12/1992 | Bradley et al. |
| 5,181,107 A | 1/1993 | Rhoades |
| 5,191,410 A | 3/1993 | McCalley et al. |
| 5,191,573 A | 3/1993 | Hair |
| 5,203,001 A | 4/1993 | Yanagiuchi et al. |
| 5,208,665 A | 5/1993 | McCalley et al. |
| 5,210,611 A | 5/1993 | Yee et al. |
| 5,221,838 A | 6/1993 | Gutman et al. |
| 5,226,080 A | 7/1993 | Cole et al. |
| 5,237,612 A | 8/1993 | Raith |
| D339,329 S | 9/1993 | Lacko |
| D339,554 S | 9/1993 | Davidson |
| 5,247,347 A | 9/1993 | Litteral et al. |
| 5,249,166 A | 9/1993 | Hamilton et al. |
| 5,251,909 A | 10/1993 | Reed et al. |
| 5,253,275 A | 10/1993 | Yurt et al. |
| 5,311,423 A | 5/1994 | Clark |
| 5,319,582 A | 6/1994 | Ma |
| 5,333,116 A | 7/1994 | Hawkins et al. |
| 5,355,302 A | 10/1994 | Martin et al. |
| 5,357,475 A | 10/1994 | Hasbun et al. |
| 5,359,698 A | 10/1994 | Goldberg et al. |
| 5,365,502 A | 11/1994 | Misono |
| 5,371,532 A | 12/1994 | Gelman et al. |
| 5,383,112 A | 1/1995 | Clark |
| 5,388,196 A | 2/1995 | Pajak et al. |
| 5,406,626 A | 4/1995 | Ryan |
| D358,364 S | 5/1995 | Siddoway |
| 5,420,690 A | 5/1995 | Koishi |
| 5,440,336 A | 8/1995 | Buhro et al. |
| 5,442,389 A | 8/1995 | Blahut et al. |
| 5,442,390 A | 8/1995 | Hooper et al. |
| 5,442,789 A | 8/1995 | Baker et al. |
| 5,463,601 A | 10/1995 | Yanagisawa |
| 5,483,658 A | 1/1996 | Grube et al. |
| D366,874 S | 2/1996 | Robinson et al. |
| 5,491,774 A | 2/1996 | Norris et al. |
| 5,491,820 A | 2/1996 | Belove et al. |
| 5,493,677 A | 2/1996 | Balogh et al. |
| 5,499,221 A | 3/1996 | Ito et al. |
| 5,499,294 A | 3/1996 | Friedman |
| 5,504,815 A | 4/1996 | Ryan et al. |
| 5,506,904 A | 4/1996 | Sheldrick et al. |
| 5,511,000 A | 4/1996 | Kaloi et al. |
| 5,511,122 A | 4/1996 | Atkinson |
| 5,513,260 A | 4/1996 | Ryan |
| D370,484 S | 6/1996 | Williamson et al. |
| 5,524,051 A | 6/1996 | Ryan |
| 5,539,658 A | 7/1996 | McCullough |
| 5,541,638 A | 7/1996 | Story |
| 5,550,863 A | 8/1996 | Yurt et al. |
| 5,553,143 A | 9/1996 | Ross et al. |
| 5,555,098 A | 9/1996 | Parulski |
| 5,557,541 A | 9/1996 | Schulhof et al. |
| 5,572,442 A | 11/1996 | Schulhof et al. |
| 5,574,787 A | 11/1996 | Ryan |
| 5,579,471 A | 11/1996 | Barber et al. |
| 5,586,186 A | 12/1996 | Yuval et al. |
| 5,590,195 A | 12/1996 | Ryan |
| 5,592,511 A | 1/1997 | Schoen et al. |
| 5,615,061 A | 3/1997 | Singh |
| D379,456 S | 5/1997 | Osiecki |
| 5,629,980 A | 5/1997 | Stefik et al. |
| 5,630,121 A | 5/1997 | Braden-Harder et al. |
| 5,634,012 A | 5/1997 | Stefik et al. |
| 5,634,080 A | 5/1997 | Kikinis et al. |
| 5,636,276 A | 6/1997 | Brugger |
| 5,638,443 A | 6/1997 | Stefik et al. |
| 5,646,992 A | 7/1997 | Subler et al. |
| 5,646,997 A | 7/1997 | Barton |
| 5,659,613 A | 8/1997 | Copeland et al. |
| 5,664,228 A | 9/1997 | Mital |
| 5,669,283 A | 9/1997 | Iida et al. |
| 5,673,315 A | 9/1997 | Wolf |
| 5,673,316 A | 9/1997 | Auerbach et al. |
| 5,675,734 A | 10/1997 | Hair |
| 5,699,526 A | 12/1997 | Siefert |
| 5,715,403 A | 2/1998 | Stefik |
| 5,724,582 A | 3/1998 | Pelanek et al. |
| 5,727,156 A | 3/1998 | Herr-Hoyman et al. |
| 5,727,159 A | 3/1998 | Kikinis |
| 5,732,219 A | 3/1998 | Blumer et al. |
| 5,734,568 A | 3/1998 | O'Connor et al. |
| 5,734,719 A | 3/1998 | Tsevdos et al. |
| 5,734,823 A | 3/1998 | Saigh et al. |
| 5,734,891 A | 3/1998 | Saigh |
| 5,745,879 A | 4/1998 | Wyman |
| 5,752,244 A | 5/1998 | Rose et al. |
| 5,757,907 A | 5/1998 | Cooper et al. |
| 5,758,069 A | 5/1998 | Olsen |
| 5,761,485 A | 6/1998 | Peters |
| 5,769,269 A | 6/1998 | Peters |
| 5,781,723 A | 7/1998 | Yee et al. |
| 5,793,980 A | 8/1998 | Glaser et al. |
| 5,796,824 A | 8/1998 | Hasebe et al. |
| 5,809,144 A | 9/1998 | Sirbu et al. |
| 5,809,246 A | 9/1998 | Goldman |
| 5,819,043 A | 10/1998 | Baugher et al. |
| 5,825,883 A | 10/1998 | Archibald et al. |
| 5,841,979 A | 11/1998 | Schulhof et al. |
| 5,845,065 A | 12/1998 | Conte et al. |
| 5,860,068 A | 1/1999 | Cook |
| 5,881,225 A | 3/1999 | Worth |
| 5,889,860 A | 3/1999 | Eller et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,918,213 A | 6/1999 | Bernard et al. |
| 5,920,861 A | 7/1999 | Hall et al. |
| 5,926,624 A * | 7/1999 | Katz et al. ............ 709/217 |
| 5,928,330 A | 7/1999 | Goetz et al. |
| D413,097 S | 8/1999 | Chang |
| 5,931,901 A | 8/1999 | Wolfe et al. |
| 5,933,498 A | 8/1999 | Schneck et al. |
| 5,940,504 A | 8/1999 | Griswold |

| | | | |
|---|---|---|---|
| 5,943,422 | A | 8/1999 | Van Wie et al. |
| 5,949,876 | A | 9/1999 | Ginter et al. |
| 5,963,916 | A | 10/1999 | Kaplan |
| 5,966,440 | A | 10/1999 | Hair |
| 5,969,283 | A | 10/1999 | Looney et al. |
| 5,970,252 | A | 10/1999 | Buxton et al. |
| 5,982,891 | A | 11/1999 | Ginter et al. |
| 5,991,402 | A | 11/1999 | Jia et al. |
| 6,002,720 | A | 12/1999 | Yurt et al. |
| 6,005,938 | A | 12/1999 | Banker et al. |
| D419,956 | S | 2/2000 | Lucaci et al. |
| 6,026,368 | A | 2/2000 | Brown et al. |
| 6,028,936 | A | 2/2000 | Hillis |
| 6,044,471 | A | 3/2000 | Colvin |
| 6,067,562 | A | 5/2000 | Goldman |
| 6,088,450 | A | 7/2000 | Davis et al. |
| 6,112,181 | A | 8/2000 | Shear et al. |
| 6,138,119 | A | 10/2000 | Hall et al. |
| 6,141,693 | A | 10/2000 | Perlman et al. |
| 6,157,721 | A | 12/2000 | Shear et al. |
| 6,157,929 | A | 12/2000 | Zamiska et al. |
| 6,158,005 | A | 12/2000 | Bharathan et al. |
| 6,170,060 | B1 | 1/2001 | Mott et al. |
| 6,182,126 | B1 | 1/2001 | Nathan et al. |
| 6,185,683 | B1 | 2/2001 | Ginter et al. |
| 6,226,618 | B1 | 5/2001 | Downs et al. |
| 6,237,786 | B1 | 5/2001 | Ginter et al. |
| 6,240,185 | B1 | 5/2001 | Van Wie et al. |
| 6,253,193 | B1 | 6/2001 | Ginter et al. |
| 6,292,569 | B1 | 9/2001 | Shear et al. |
| 6,363,488 | B1 | 3/2002 | Ginter et al. |
| 6,385,596 | B1 | 5/2002 | Wiser et al. |
| 6,389,402 | B1 | 5/2002 | Ginter et al. |
| 6,389,541 | B1 | 5/2002 | Patterson |
| 6,427,140 | B1 | 7/2002 | Ginter et al. |
| 6,449,367 | B2 | 9/2002 | Van Wie et al. |
| 6,560,651 | B2 * | 5/2003 | Katz et al. ............. 709/229 |
| 6,718,328 | B1 * | 4/2004 | Norris ................... 709/229 |
| 6,810,389 | B1 * | 10/2004 | Meyer ..................... 705/59 |
| 7,213,266 | B1 * | 5/2007 | Maher et al. ............. 726/26 |
| 7,324,644 | B2 * | 1/2008 | Saito ..................... 380/200 |
| 7,350,321 | B2 * | 4/2008 | Soon et al. ................ 36/45 |
| 7,353,541 | B1 * | 4/2008 | Ishibashi et al. ......... 726/26 |
| 2002/0164047 | A1 * | 11/2002 | Yuval ................... 382/100 |
| 2004/0024688 | A1 * | 2/2004 | Bi et al. .................. 705/37 |

FOREIGN PATENT DOCUMENTS

| | | |
|---|---|---|
| EP | 0302710 | 8/1989 |
| FR | 2651352 | 1/1991 |
| WO | WO 87/04309 | 7/1987 |
| WO | WO 96/35987 | 11/1996 |

OTHER PUBLICATIONS

Cox, Meg, *Electronic Campus, Technology Threatens to Shatter the World of College Textbooks*, The Wall Street Journal, Tuesday, Jun. 1, 1993, 2 pp.

Deloddere, Daniel, et al., *Interactive Video on Demand*, IEEE Communications Magazine, May 1994, pp. 82-88.

Desmedt, Yvo, et al., *Multi-Receiver/Multi-Sender Network Security: Efficient Authenticated Multicast/Feedback*, INFOCOM '92 IEEE, pp. 2045-54,.

Dvorak, Radka, et al., *A Methodology for User Centered Link Structures for Textbook to Hypertext Conversion*, IEEE 1992, pp. 619-628.

Farn, Kwo-Jean, et al., *An Authenticate Processing for the Information System in Industrial Technology Research Institute*, in IEEE International Carnahan Conference on Security Technology, 1991, pp: 59-67.

Fisher, Daniel, *Technology and You: This Little Computer Tries to be a Book*, St. Louis Post-Dispatch, Wednesday, Jan. 4, 1995, 2 pp.

Gilles, John, Web Review—Liquid Audio Fine Tunes Music on Demand, http://www.webreview.com/97/01/03/feature/index.html, Jan. 1997.

Jones, Richard J., *Baseband and Passband Transport Systems for interactive Video Services*, IEEE Communications Magazine, May 1994, pp. 90-101.

Kang, Chang Goo, *New Digital Multisignature Scheme in Electronic Contract Systems*, Proceedings 1995 IEEE International Symposium on Information Theory: Whistler Conference Centre, Whistler, British Columbia, Canada, Sep. 17-22, 1995, p. 486.

Kaplan, Marc A., IBM Cryptolopes™, *Super Distribution and Digital Rights Management*, http://www.research.ibm.com/people/kaplan/crypotolope-docs/crypap.html, Mar. 27, 2000, 9 pgs.

Microsoft Computer Dictionary (Microsoft Press 2nd ed.), 1994, pp. 188-213.

Nessert, D.M., *Layering Central Authentication on Existing Distributed System Terminal Services*, IEEE 1989, pp. 290-299.

Pobiak, Bernard C., *Adjustable Access Electronic Books*, IEEE, 1992, pp. 90-94.

Ramanathan, Sprinivas et al., *Architectures for Personalized Multimedia*, IEEE Multimedia, 1994, pp. 37-46.

Ramos, Tony, *Can you Digit? Making Book on Electronics Books*, Collegestore Journal, Sep./Oct. 1992, 2 pp.

Schulof, Nathan, *Silicon Valley Start-Up to Create New On-ramp to the Information Superhighway with its Listen-Up Audio System and Audio On-Demand Subscription Service*, Information Highway Media Corporation, Sep. 1994, 3 pp.

Steinert-Threlkeld, Tom, *Now, Data by Satellite*, Inter@ctive Week, 1 p.

Watanabe, Toyohide et al., *Visual Interface for Retrieval of Electronic-formed Books*, IEEE 1993, pp. 692-695.

Ziegler, Bart, *IBM to Unveil Plan to Skip Disks, Send Software by Satellite*, The Wall Street Journal, Tuesday, Nov. 1, 1994, 1 p.

*Aural Hygiene*, Auto Week, Nov. 14, p. 10.

*Be Listening Up: PC Today Features News Article on Information Highway*, Media Corporation 76 Pc Today, Jan. 1985, 1 p.

*Buying Music Over the Internet*, Newsbytes, http://drink.mnis,net/cgi-bin/index.cg.N=Reynods%2C+Pamela&U=preynolds &B=Rank, Jan. 1997.

*The Captive Audience Network*, 44 Popular Science, Feb. 1995, 1 p.

*Listen Up Audio System and Audio-on-Demand to Open New Infobahn On-Ramp*, Information Highway Media Corporation, IHM-94001.F.9/19/94, 1 pg.

*Listen Up Audio System and Audio on Demand Subscription Service Write-Up*, Electronic Entertainment. Feb., 1 p.

*Read Me a Story*, Popular Mechanics, Feb. 1995, 1 p.

Nelson B. Heller & Associates, *Microtome to Deliver Publishers' Texts Electronically at Point of Purchase*, The Heller Report, vol. IV, No. 12, Oct. 1993, 3 pgs.

* cited by examiner

TIME-BASED DIGITAL CONTENT AUTHORIZATION

PRIORITY CLAIM

The present patent application is a continuation of Ser. No. 10/179,762 filed Jun. 24, 2002, now abandoned which claims priority to provisional application Ser. No. 60/301,115 filed Jun. 25, 2001.

FIELD OF THE INVENTION

The invention relates to digital content playback systems. More particularly, the invention relates to time-based authorization for accessing digital content.

BACKGROUND OF THE INVENTION

Typical digital content providers allow users to access digital content on a file-by-file basis. For example, if a user wishes to listen to an audio book, the user pays for and downloads a digital copy of the audio book. Other types of digital content (e.g., music, movies) can be accessed in a similar manner. For users that access digital content at or above a certain rate, providers of digital content often provide reduced prices compared to users that access digital content below the certain rate. The overhead involved in tracking accounts for multiple users with multiple pricing arrangements on a file-by-file basis can be complex. Additionally, per-unit pricing of content requires a user to make a purchase decision for each new content item, which can inhibit a user from accessing digital content, and can prevent a user from forming habits of accessing content regularly.

Subscription-based World Wide Web pages provide unlimited access for a predetermined period of time (e.g., month, year) based on a user's account balance. Such subscription-based content providers typically provide current events (e.g., news, sports, entertainment) that are interesting to users for a relatively short period of time. One problem with applying subscription-based access to long-term digital content (e.g., audio books, movies, music) is that a user can download content during a purchased predetermined period of time and consume the content over an extended period of time. The subscription cost of subscription-based access to long-term digital content would have to be relatively high for the content provider to remain profitable.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

Figure 1:
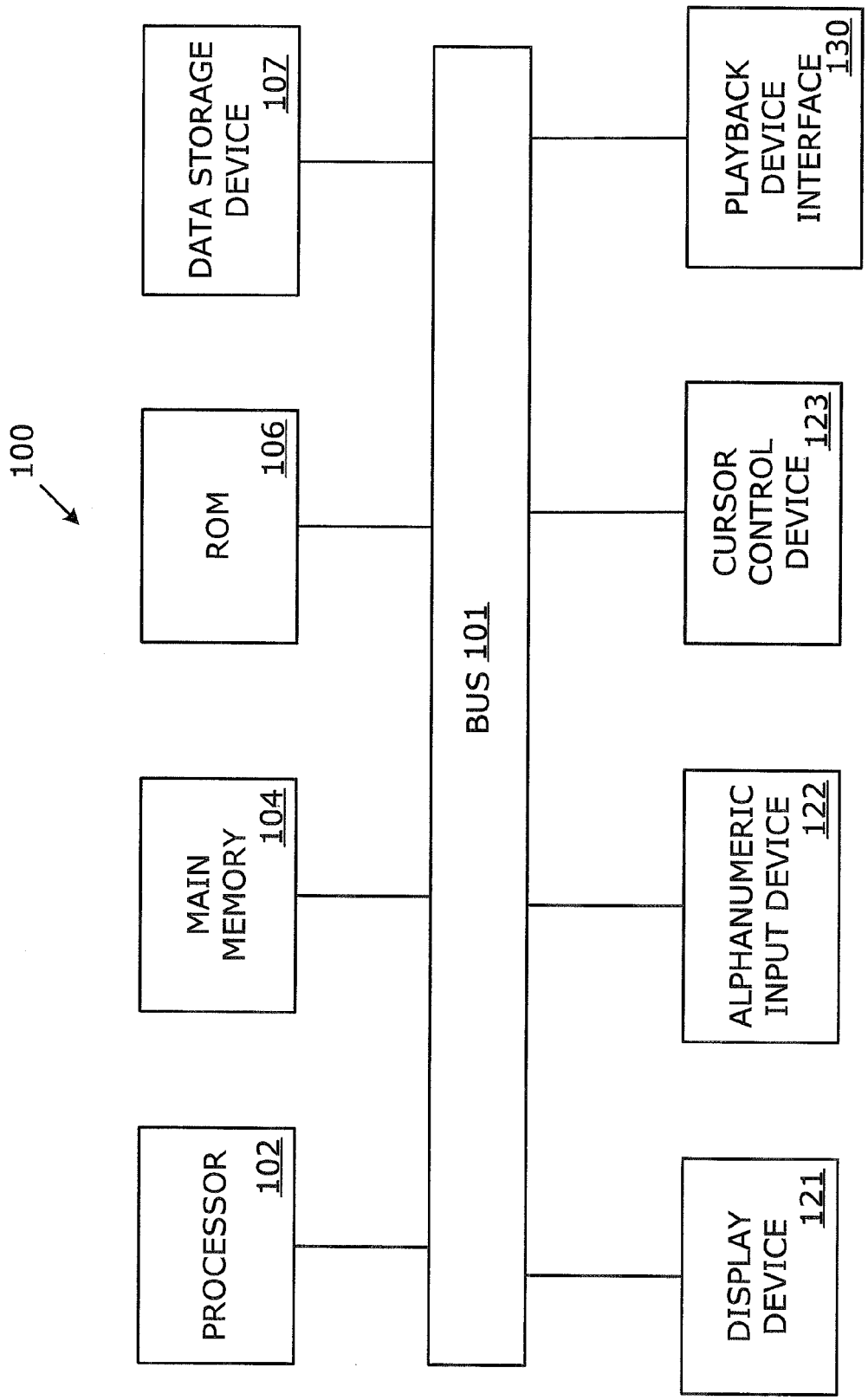
FIG. 1 is one embodiment of an electronic system.

Methods and apparatuses for time-based authorization for accessing digital content are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions which follow are presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion throughout the description, discussions utilizing terms such as "processing" or "igenerating" or "calculating" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to apparatuses for performing the operations herein. An apparatus may be specially constructed for the required purposes, or it may comprise a general purpose computer selectively activated or reconfigured by a computer program stored in the computer. Such a computer program may be stored in a computer accessible storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus, or instructions received over a network.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the invention is not described with reference to any particular programming language. It will be appreciated that a variety of programming languages may be used to implement the teachings of the invention as described herein.

In general, a service is provided wherein access to a set of digital content (e.g., audio recordings including voice and/or music, video recordings, audio/video recordings) is provided for a predetermined period of time. During the predetermined period of time the service is provided, a user can access (e.g., download, play) any digital content in the set of digital content. At the end of the predetermined period of time, the service is terminated and the user is denied access to the digital content regardless of where the content is stored (e.g., in a digital content library, on a computer system controlled by the user, on a playback device controlled by the user). Simplified access and control of digital content is thereby provided in the form of time-based access. Thus, a user can select from a full array of digital content to access, and the service provider can supply the content without having it accessed too cheaply.

FIG. 1 is one embodiment of an electronic system. Electronic system 100 includes bus 101 or other communication device to communicate information, and processor 102 coupled with bus 101 to process information. Electronic system 100 further includes random access memory (RAM) or other dynamic storage device 104 (referred to as main memory), coupled to bus 101 to store information and instructions to be executed by processor 102. Main memory 104 also can be used to store temporary variables or other intermediate information during execution of instructions by processor 102. Electronic system 100 also includes read only memory (ROM) and/or other static storage device 106 coupled to bus 101 for storing static information and instructions for processor 102. Data storage device 107 is coupled to bus 101 to store information and instructions.

Data storage device 107 such as a magnetic disk or optical disc and its corresponding drive can be coupled to electronic system 100. Electronic system 100 can also be coupled via bus 101 to display device 121, such as a cathode ray tube (CRT) or liquid crystal display (LCD), to display information to a system user. Alphanumeric input device 122, including alphanumeric and other keys, is typically coupled to bus 101 to communicate information and command selections to processor 102. Another type of user input device is cursor control 123, such as a mouse, a trackball, or cursor direction keys to communicate direction information and command selections to processor 102 and to control cursor movement on display 121.

In one embodiment, electronic system 100 further includes playback device interface 130 that provides a communications interface between electronic system 100 and a mobile playback device (not shown in FIG. 1). Playback device interface 130 can be, for example, a docking station coupled to a port (not shown in FIG. 1) of electronic system 100 (e.g., serial port, parallel port, SCSI interface, USB interface). The docking station is configured to receive a mobile playback device. Playback device interface 130 allows electronic system 100 to communicate licensing information, digital content, and other data to and receive data from a mobile playback device.

In one embodiment, the invention is related to the use of electronic system 100 to access digital content in a time-based manner. According to one embodiment, accessing the digital content is performed by a computer system, one form of electronic system 100, in response to processor 102 executing sequences of instructions contained in memory 104.

Instructions are provided to main memory 104 from a storage device, such as magnetic disk, CD-ROM, DVD, via a remote connection (e.g., over a network), etc. In alternative embodiments, hard-wired circuitry can be used in place of or in combination with software instructions to implement the invention. Thus, the invention is not limited to any specific combination of hardware circuitry and software.

Figure 2:
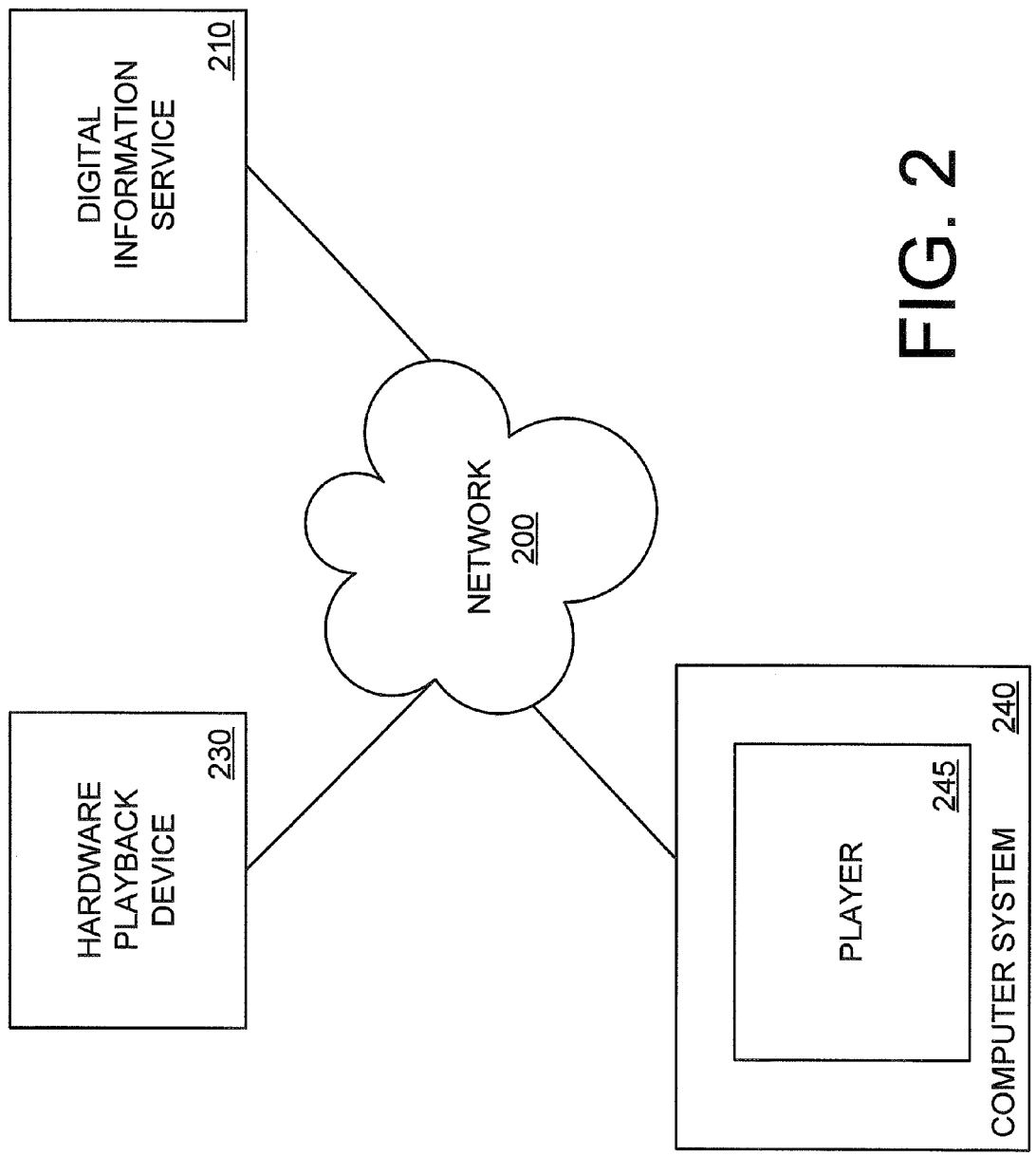
FIG. 2 is one embodiment of an architecture that provides digital information for playback.

FIG. 2 is one embodiment of an architecture that provides digital information for playback suitable for use with the invention. Server 210 is coupled to multiple playback devices, including hardware playback devices (e.g., 230) and players (e.g., 245 running on computer system 240), by network 200. Any number of hardware playback devices and players can be coupled to server 210 by network 200. As described in greater detail below, the architecture of FIG. 2 can provide time-based authorization for accessing digital content.

In one embodiment, network 200 is the Internet; however, other networks can be used. For example, network 200 can be an intranet that couples together only computer systems and other devices that belong to a particular organization. Network 200 can also represent a group of networks, such as a group of local area networks.

Server 210 stores digital information that defines programming as well as information about authorized users of the digital information. In one embodiment, server 210 stores a library of digital content that can be retrieved by authorized users for later playback by authorized playback devices. The library of digital content can include audio books, recordings of lecture series, news, plays, movies, etc.

Hardware playback device 230 stores programs from server 210 for playback. Hardware playback device 230 can store all or a portion of one or more programs. Also, hardware playback device 230 can be coupled to network 200 directly or by a computer system (not shown in FIG. 2) that accesses server 210. Hardware playback device 230 represents a device or combination of devices that play back the programs (e.g., set-top box, dedicated content player, mobile electronic systems, etc.). Computer system 240 runs player 245 and can play digital content from server 210. Server 210 can also be a license management device or another device (not shown in FIG. 2) can be a license management device.

Figure 3:
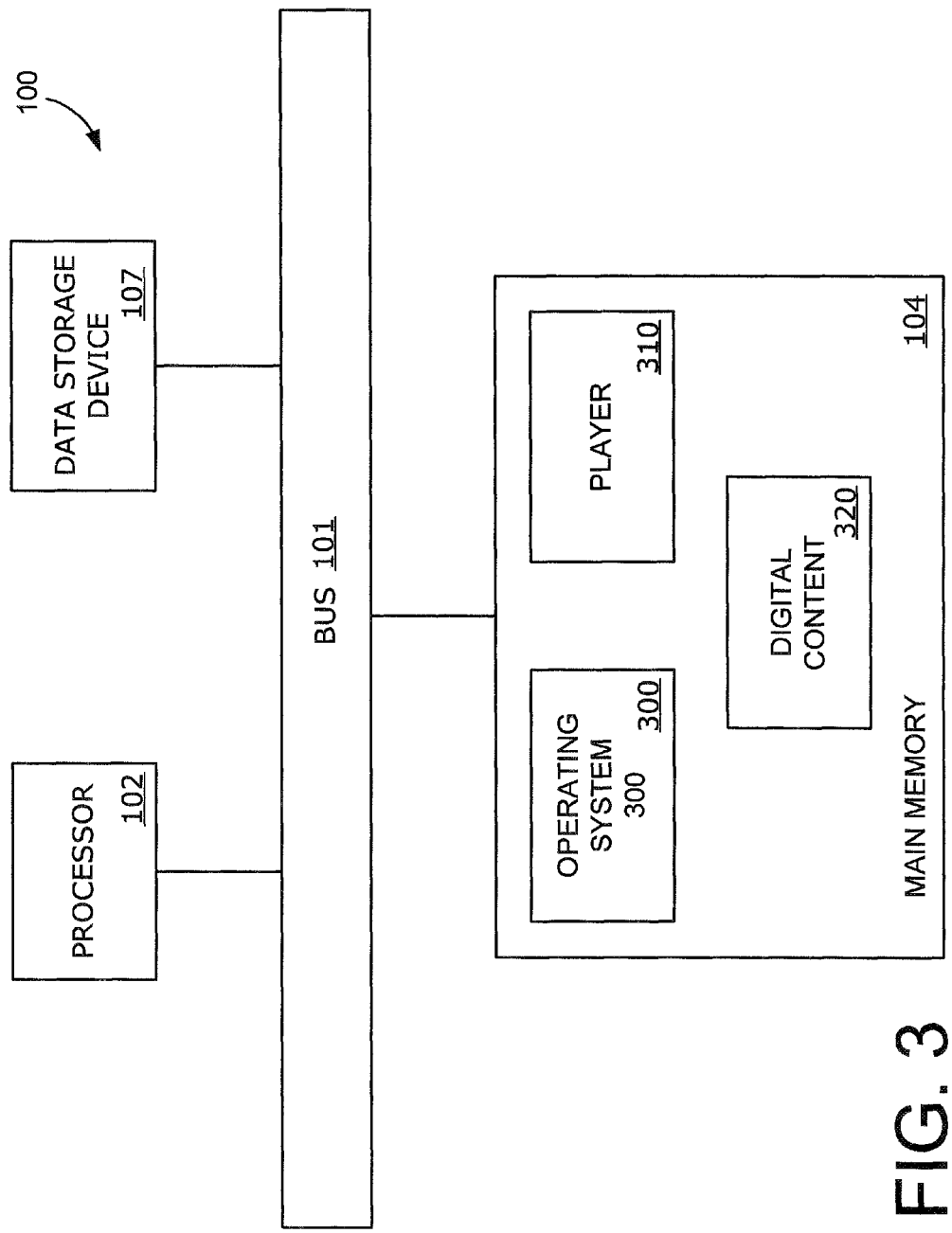
FIG. 3 is one embodiment of an electronic system running a digital information player.

FIG. 3 is one embodiment of an electronic system running a digital information player. Processor 102 executes sequences of instructions stored in main memory 104 including sequences of instructions defining operating system 300 and player 310. Operating system 300 is a set of instructions that directs operation of electronic system 100. Thus, it may be any program ranging from a commercial software operating system to proprietary firmware that controls the function of electronic system 100. Electronic system 100 may be a computer system, dedicated playback device, set-top box including digital video recorders, a personal digital assistant (PDA), automobile entertainment system, mobile wireless communication device, or other device capable of playing digital content, or a combination of devices coupled with each other to play digital content.

Main memory 104 further includes digital content 320 that is all or a portion of programming received from a server. Additional programs, or additional portions of digital content 320, can be stored by storage device 107 and copied to main memory 104 as necessary. Storage device 107 may include flash, random access memory (RAM), random operating memory (ROM), and optical or magnetic disk drives.

Processor 102 retrieves data from digital content 320 and outputs audio and/or video in response to the data. Processor 102 can also retrieve digital content data from a network connection (not shown in FIG. 3), either wired (e.g., coaxial, CAT-5) or wireless (e.g., infrared, radio frequency signals) for playback or for storage in main memory 104.

Figure 4:
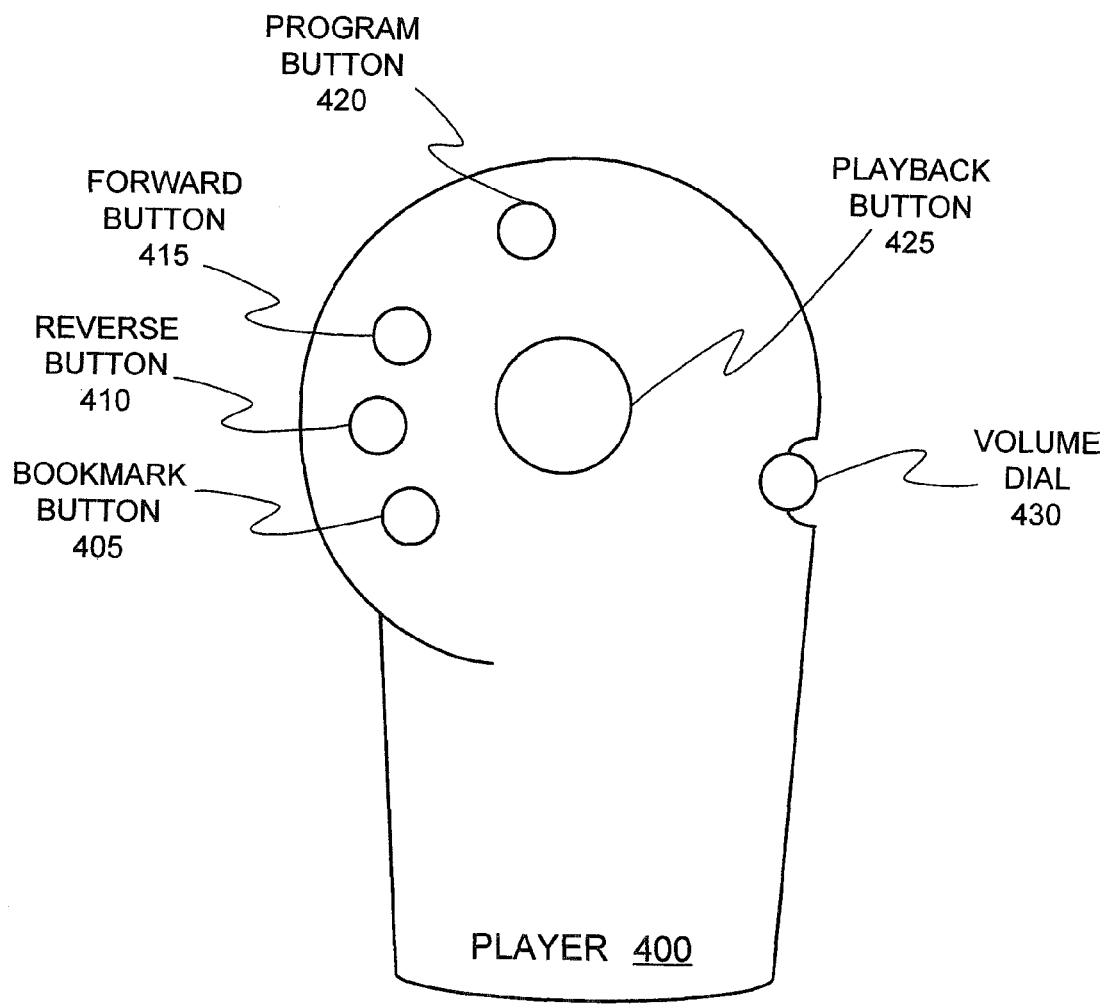
FIG. 4 is one embodiment of a hardware playback device.

FIG. 4 is one embodiment of a hardware playback device suitable for use with the invention. Player 400 is a mobile playback device that allows digital content to be downloaded, for example, via a playback device interface and played back later. A user can utilize the buttons on player 400 to navigate through stored data to replay desired digital content.

Player 400 includes buttons 405, 410, 415, 420 and 425 and volume dial 430. Further details of player 400 can be found in U.S. patent application Ser. No. 08/710,114 filed Sep. 12, 1996. In summary, player 400 includes a processor and internal random access memory (RAM), read only memory (ROM) and a memory storage device such as flash memory. In one embodiment the ROM stores an operating system, while the flash memory (or other memory storage device) stores digital content.

Player 400 can also include an interface to receive removable media to store digital content. For example, flash memory cards storing audio content can be inserted into player 400. Digital content stored on the removable media can be played back directly from the removable media or copied from the removable media and stored in player 400 for later playback.

Figure 5:
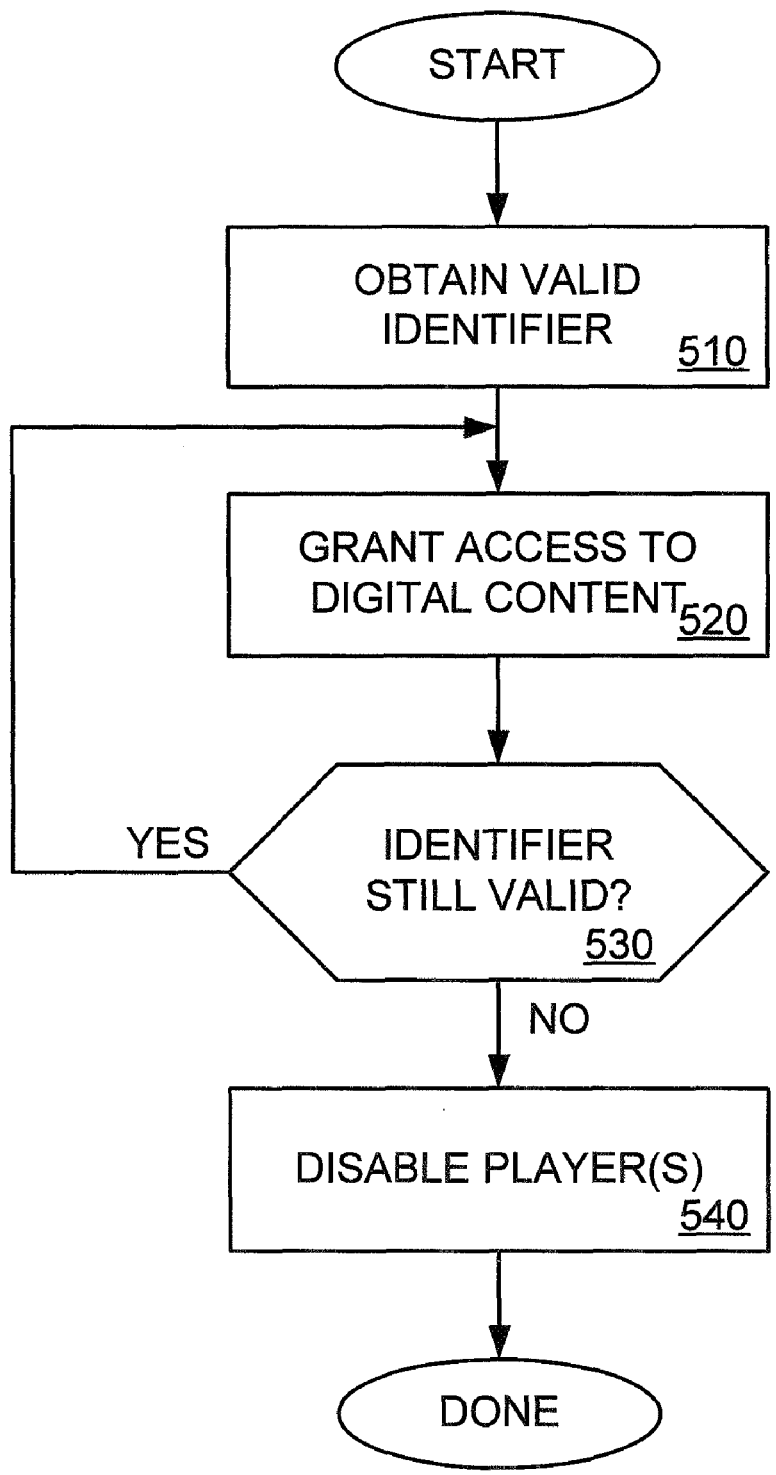
FIG. 5 is a flow diagram of a first embodiment of time-based digital content authorization.

FIG. 5 is a flow diagram of a first embodiment of time-based digital content authorization. In general, the embodiment of FIG. 5 results in allowing a user access to digital content so long as a license is valid. If the license expires or is not renewed, the user's playback device(s) is/are disabled.

In one embodiment, licenses to digital content are mapped to identifiers stored by various playback devices. For example, each playback device (hardware playback device or software player) can have a PlayerID that is used to uniquely identify the playback device. Each playback device can also have a SecondaryID that can be used if the PlayerID becomes corrupted or lost. Each playback device can also have one or more GroupIDs that identify multiple playback devices as belonging to a group.

In one embodiment, registration and activation of the various identifiers is accomplished as described in U.S. Pat. No. 6,158,005, entitled "CLONING PROTECTION SCHEME FOR A DIGITAL INFORMATION PLAYBACK DEVICE," which is assigned to the corporate assignee of the present application and fully incorporated by reference herein. Other registration and/or activation methods can also be used, for example, one or more identifiers can be hardwired into a playback device, identifiers can be provided by a server with different registration, cloning and/or activation methods.

A playback device obtains a valid identifier at 510. In one embodiment, GroupIDs are obtained from a digital content library, or other device, through an activation process. The GroupIDs can be distributed based on, for example, a user's account status or other factors (e.g., employment status, status with respect to some particular group, physical status). In an alternate embodiment, the status of PlayerIDs are maintained by the digital content library, or other device, where the status is determined based on, for example, the user's account status or other factors.

One or more identifiers are stored in the playback device. In one embodiment, the identifier is encrypted to protect the identifier from cloning or theft; however, identifier security is not necessary to provide access to the digital content. One or more identifiers can also be stored in a device associated with the playback device, for example, a computer system that retrieves digital content for use with a mobile playback device can store one or more identifiers associated with the mobile playback device.

Access to digital content is granted at 520. In one embodiment, digital content files include a list of valid identifiers. If a playback device identifier matches one of the identifiers stored in the digital content file, the playback device is authorized to playback the content. Access to any set of digital content can be granted with each identifier. For example, an identifier can provide access to a complete digital content library. A different identifier can be used for each of multiple subsets of the digital content library. Other identifiers can be used to provide similar access to other digital content libraries.

Subsequent accesses to the digital content are allowed as long as the appropriate identifier is still valid at 530. For example, a user can purchase an identifier that activates the service, allowing the user access to certain digital content for a one month period. The identifier is valid for one month and passes the test at 530 for one month, which allows access to the digital content at 520. At the end of the one month period, the service is deactivated and the one or more players having the identifier are disabled at 540. Other time periods can also be used.

In one embodiment, when a playback device attempts to access digital content with an invalid identifier the playback device is disabled. In an alternative embodiment, the playback device is automatically disabled when the identifier expires. In one embodiment, a grace period (e.g., two days, one week) is provided that extends the service after the identifier expires.

In one embodiment, a user can keep the service activated by extending the period of an identifier's validity by, for example, adding to an account with the digital content library. In an alternative embodiment, a new valid identifier is required to replace an expired identifier. Thus, enabling or disabling the playback device can control access to digital content.

Figure 6:
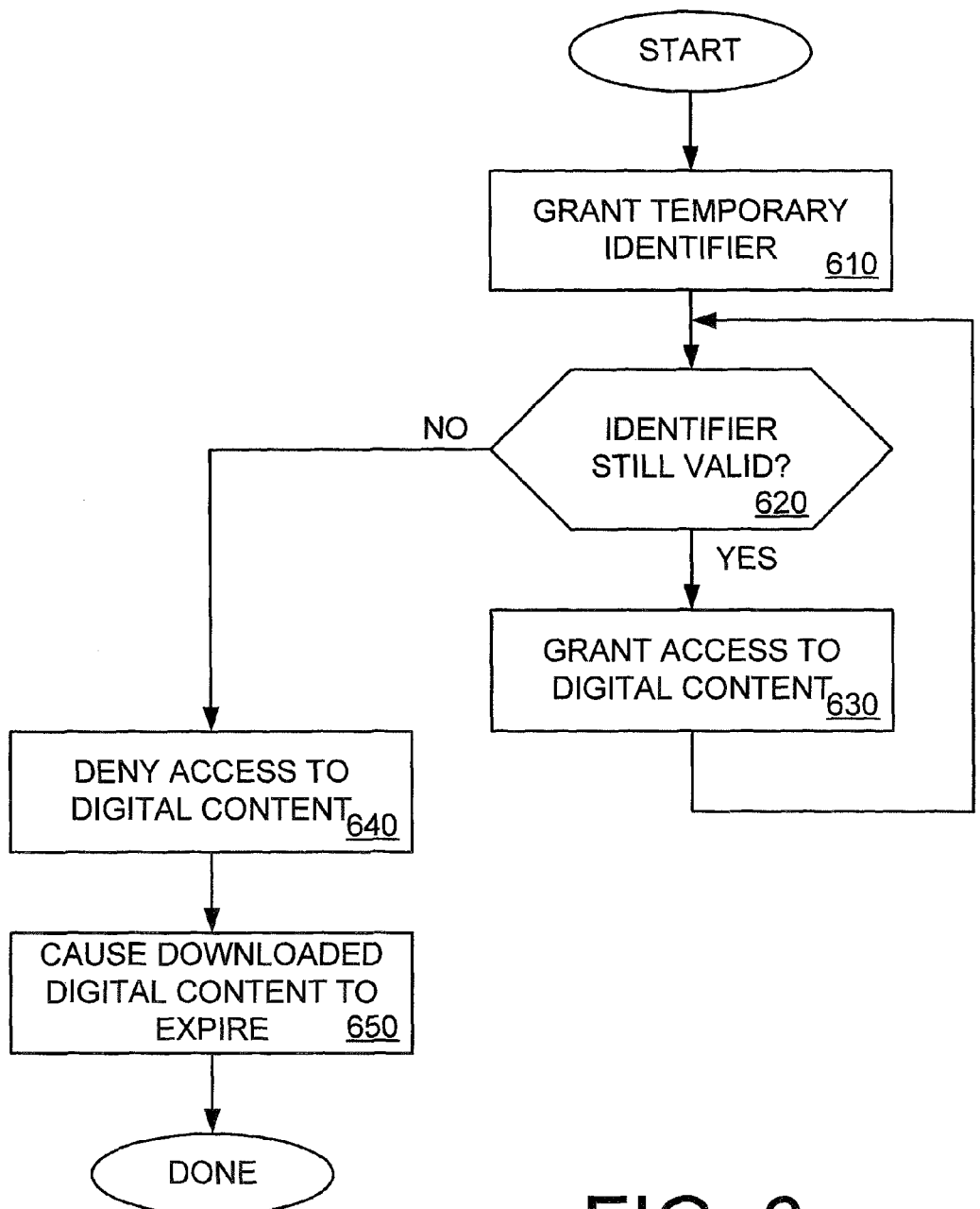
FIG. 6 is a flow diagram of a second embodiment of time-based digital content authorization.

FIG. 6 is a flow diagram of a second embodiment of time-based digital content authorization. The embodiment of FIG. 5 allows access to digital content as long as a license is valid, and the player is disabled when an invalid license is used. In contrast, the embodiment of FIG. 6 allows access to digital content as long as a temporary identifier is valid, and the digital content is rendered unplayable when the identifier expires.

A temporary identifier is granted at 610. In one embodiment, the temporary identifier has an associated time period during which the identifier is valid. Upon expiration of the time period, the identifier is no longer valid. In an alternative embodiment, digital content that is targeted for a particular playback device includes at least one copy of the temporary identifier (and possibly other identifiers). The digital content also includes a time period during which the identifier is valid. At the expiration of the time period, the temporary identifier in the digital content expires.

If the identifier is valid at 620, access to the digital content is granted at 630. In one embodiment, the digital content includes a list of valid identifiers. If the identifier of the playback device matches an identifier in the digital content, the identifier is valid and the digital content is authorized for playback. Other methods for determining whether an identifier is valid can also be used.

If the identifier is not valid at 620, access to the digital content is denied at 640. For example, if the digital content is stored by the digital content library, the ability to download, play, or otherwise access the digital content corresponding to the identifier is denied. This can be accomplished by any manner known in the art.

When an identifier is invalid at 620, downloaded digital content is caused to expire at 650. In one embodiment, the digital content includes a list of valid identifiers. The identifier stored by the digital content and/or the identifier stored by the playback device can expire. If one or both of the identifiers is expired, the playback device cannot playback the digital content. In an alternative embodiment, the digital content library actively causes the identifier to expire by, for example, notifying the playback device, or some related device, that the identifier has expired.

Figure 7:
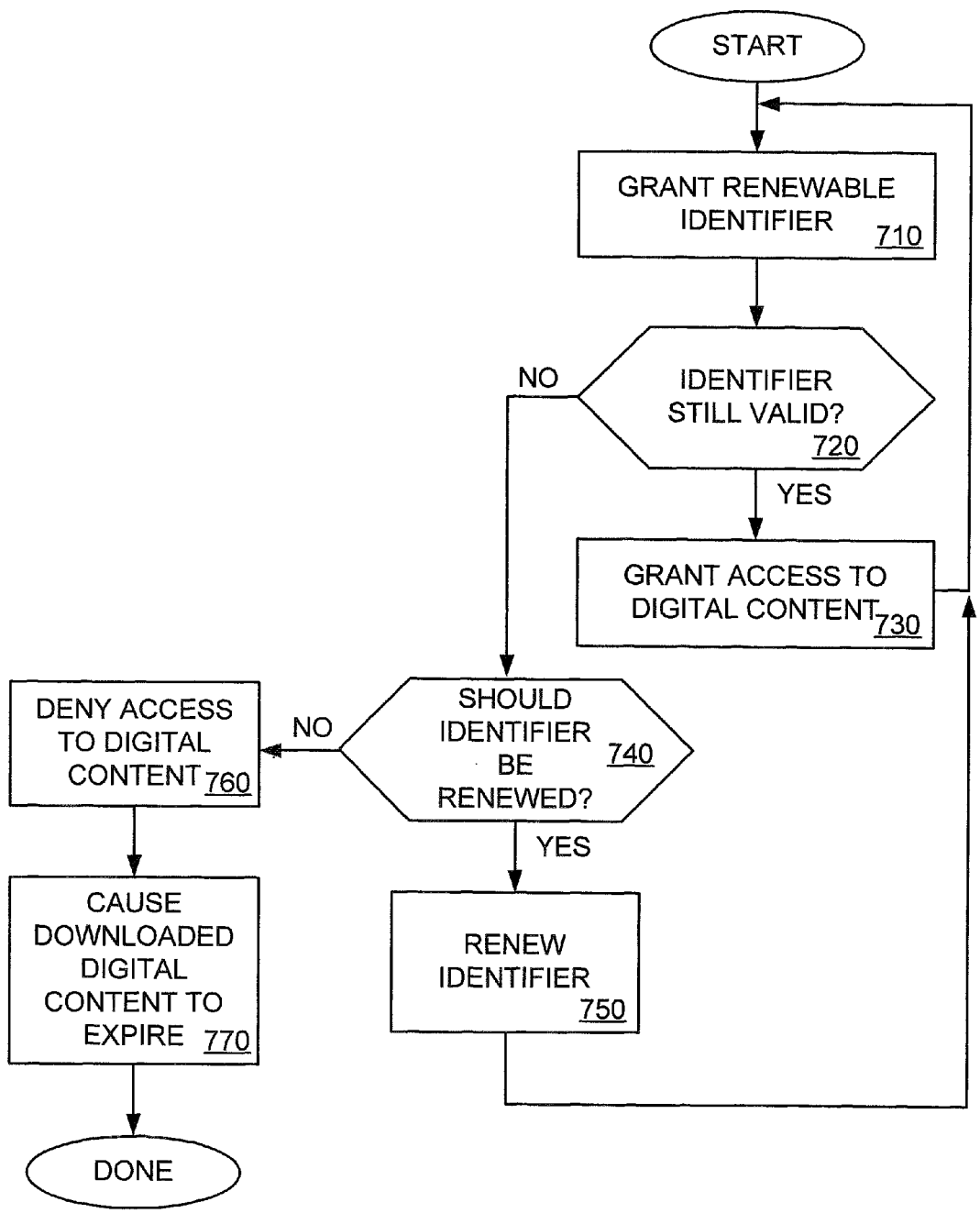
FIG. 7 is a flow diagram of a third embodiment of time-based digital content authorization.

FIG. 7 is a flow diagram of a third embodiment of time-based digital content authorization. The embodiment of FIG. 6 allows a user to keep the service activated by obtaining a new identifier to allow access to digital content. In contrast, the embodiment of FIG. 7 provides for access to digital content with a renewable identifier. This enables a user to renew or extend the service activation by extending the time period during which the identifier is valid.

The renewable identifier is granted at 710. If the identifier is valid at 720, access to digital content is granted at 730. Access can be granted to digital content that is stored by the digital content library and to digital content that has been downloaded, as described above. Access is granted during the time period for which the renewable identifier is valid.

If the identifier is not valid at 720, it is determined whether the identifier should be renewed at 740. The identifier can be renewed, for example, based on whether a user's account is current. The user can add to his/her account to extend the time period for which the renewable identifier is valid. If the identifier is renewed at 750, the identifier will be valid at 720 and access to the digital content is granted at 730.

If the identifier is not renewed at 740, the service is deactivated and access to the digital content is denied at 760. Access to the digital content can be denied as described above. Once the service is deactivated and access to digital content is denied at 760, downloaded digital content is caused to expire at 770. Downloaded digital content can be caused to expire as described above.

The embodiments of FIGS. 5-7 are not necessarily independent of each other. Multiple embodiments can be used with a single playback device or a set of digital content. Various modifications of the embodiments of FIGS. 5-7 can also be used with the embodiments described.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

The invention claimed is:

1. A system comprising:
a digital content library configured to store audio visual (AV) content, the digital content library containing one or more digital content files of AV content, each digital content file storing a list of valid identifiers; and
a playback device coupled to the digital content library through a network, the playback device storing an identifier that identifies the playback device, the identifier comprising at least one of a temporary identifier and a renewable identifier, and the playback device further storing at least a portion of one or more digital content files downloaded from the digital content library for later playback,
wherein the playback device is configured to:
access and download, from the digital content library through a playback device interface, a group of different digital content files stored by the digital content library, only if the identifier stored in the playback device matches one of the valid identifiers in the list of valid identifiers for each of the different digital content files in the group, and
play the downloaded AV content of the downloaded group of different digital content files,
wherein the playback device is authorized to access and download the group of different digital content files for a predetermined period of time, wherein access by the playback device to the group of different digital content files is granted on a group basis, and
wherein the playback device is prevented at the expiration of the predetermined period of time from accessing and downloading the group of different digital content files stored by the digital content library and prevented from playing the AV content of the downloaded group of different digital content files, and
wherein preventing the playing of the AV content of the downloaded group of different digital content files comprises disabling the playback device.

2. The system of claim 1 wherein the predetermined period of time is dynamically extensible beyond the predetermined period of time.

3. The system of claim 1 wherein the playback device comprises a mobile playback device coupled to a computer system.

4. The system of claim 1 wherein the playback device comprises a mobile playback device.

5. The system of claim 1 wherein the playback device comprises a set-top box.

6. The system of claim 1 wherein the playback device comprises a set-top box coupled to a mobile playback device.

7. The system of claim 1 wherein the digital content library comprises a computer system.

8. The system claim 1 wherein the digital content library comprises a storage medium.

9. A computer-implemented method comprising:
under the control of one or more computing devices,
granting access, for a predetermined period of time, to a group of digital content files from a digital library downloaded on a playback device,
wherein the playback device has stored thereon one or more identifiers,
wherein each of the digital content files of the group includes a list of valid identifiers,
wherein access is granted if at least one of the one or more identifiers stored in the playback device matches one valid identifier in the list of valid identifiers for each of the digital content files of the group,
wherein the at least one of the one or more identifiers has an associated time period during which the at least one identifier is valid, and
wherein access to the group of digital content files is granted on a group basis;
allowing access by the playback device to the group of digital content files for the predetermined period of time, wherein access comprises:
making authorized copies of some or all of the digital content files of the group, and
playing the copied digital content files; and
denying access by the playback device to the group of digital content files upon the expiration of the predetermined period of time, wherein denying access by the playback device comprise:
disabling the playback device, and preventing copying of the digital content files accessed.

10. The computer-implemented method of claim 9 wherein the predetermined period of time is dynamically extensible beyond the predetermined period of time.

11. The computer-implemented method of claim 9 wherein the playback device comprises a mobile playback device coupled to a computer system.

12. The computer-implemented method of claim 9 wherein the playback device comprises a mobile playback device.

13. The computer-implemented method of claim 9 wherein the playback device comprises a set-top box.

14. The computer-implemented method of claim 9 wherein the playback device comprises a set-top box coupled to a mobile playback device.

15. The computer-implemented method of claim 9 wherein the digital content files are contained on a computer system.

16. The computer-implemented method of claim 9 wherein the digital content files are contained on a storage medium.

17. An article comprising a non-transitory computer-readable medium to provide content to cause one or more electronic devices to:
grant access, for a predetermined period of time, to a group of digital content files from a digital library downloaded on a playback device,
wherein the playback device has stored thereon at least one identifier identifying the playback device,
wherein each of the digital content files of the group includes a list of valid identifiers, and
wherein access is granted if the at least one identifier identifying the playback device matches one valid identifier in the list of valid identifiers for each of the digital content files of the group,
wherein the at least one identifier has an associated time period during which the at least one identifier is valid, and
wherein access to the group of digital content files is granted on a group basis;
allow access by the playback device to the group of digital content files for the predetermined period of time, wherein access comprises:
making authorized copies of some or all of the digital content files of the group, and
playing the copied digital content files; and
deny access by the playback device to the group of digital content files at the expiration of the predetermined period of time, wherein denying access comprises:
disabling the playback device, and
preventing copying by the playback device of the group of digital content files accessed.

18. The article of claim 17 wherein the predetermined period of time is dynamically extensible beyond the predetermined period of time.

19. The article of claim 17 wherein the playback device comprises a mobile playback device coupled to a computer system.

20. The article of claim 17 wherein the playback device comprises a mobile playback device.

21. The article of claim 17 wherein the playback device comprises a set-top box.

22. The article of claim 17 wherein the playback device comprises a set-top box coupled to a mobile playback device.

23. The article of claim 17 wherein the digital content files are contained on a computer system.

24. The article of claim 17 wherein the digital content files are contained on a storage medium.

* * * * *